April 28, 1925.
J. E. BOOGE
1,535,760
MANUFACTURE OF LITHOPONE
Filed Nov. 3, 1920
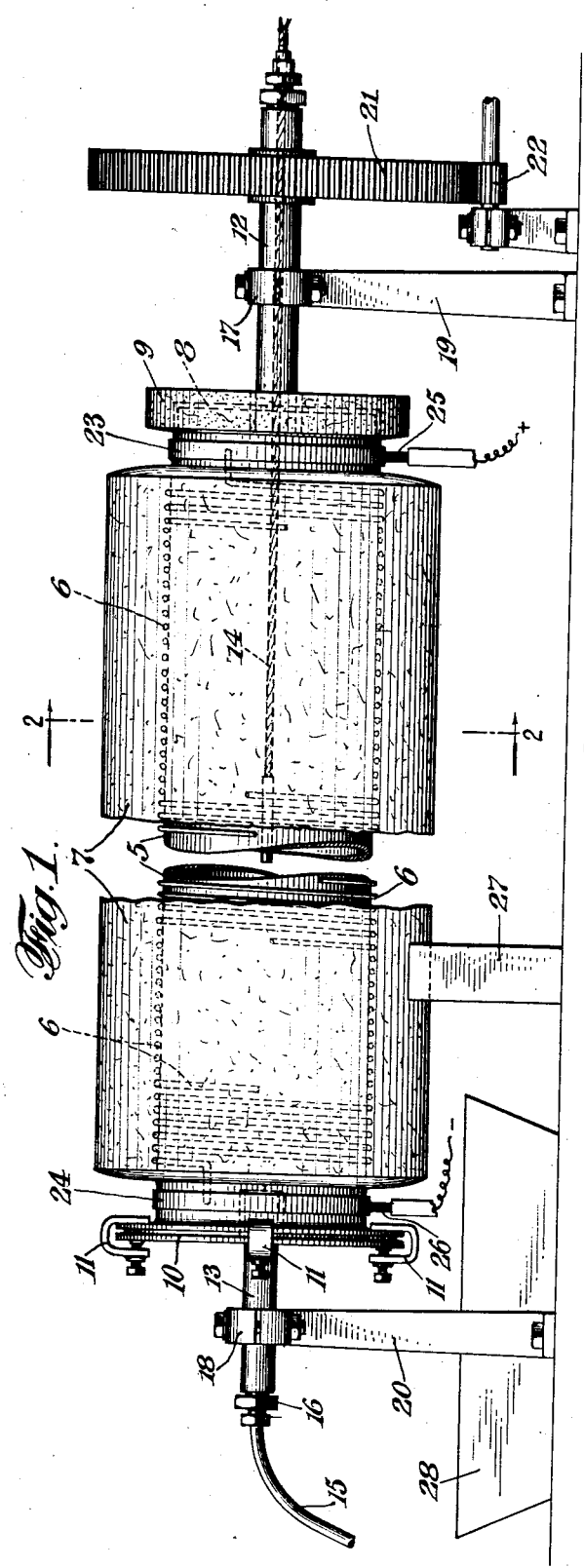
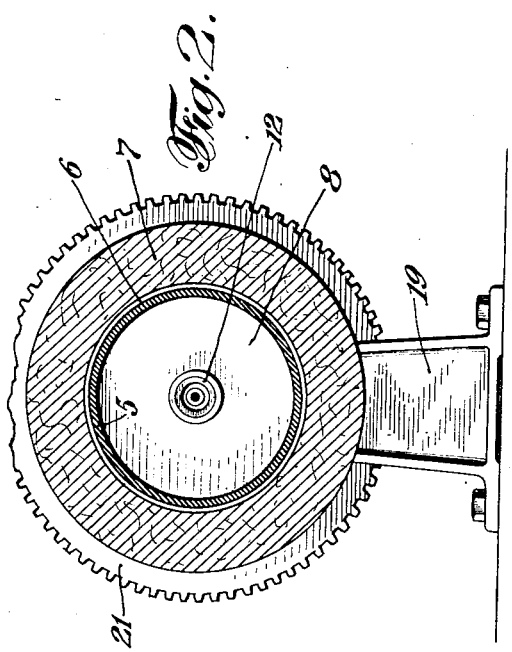
J. E. Booge, INVENTOR,
BY *J. R. Squair,*
ATTORNEY Patented Apr. 28, 1925.

1,535,760

UNITED STATES PATENT OFFICE.

JAMES ELIOT BOOGE, OF WILMINGTON, DELAWARE, ASSIGNOR TO E. I. DU PONT DE NEMOURS & COMPANY, OF WILMINGTON, DELAWARE, A CORPORATION OF DELAWARE.

MANUFACTURE OF LITHOPONE.

Application filed November 3, 1920. Serial No. 421,432.

*To all whom it may concern:*

Be it known that I, JAMES ELIOT BOOGE, a citizen of the United States, and a resident of Wilmington, in the county of New Castle and State of Delaware, have invented a certain new and useful Manufacture of Lithopone, of which the following is a specification.

This invention relates to the manufacture of lithopone, and pertains especially to the calcining operation.

In the process of muffling lithopone, one of the important steps is the calcination of the pigment. The precipitated mixture of zinc sulphide and barium sulphate ordinarily known as raw lithopone, is filtered and dried, and then heated until it is perceptibly red (the color first appears below 600° C.). After the proper temperature has been reached, the pigment is quenched in water. The main object of this calcination is to increase the tinting strength of the pigment, a second object being to decrease the oil absorption. The raw lithopone before this treatment, is so deficient in strength or hiding power as to be useless for application as a pigment. The calcination process was first discovered in 1874 by Griffiths, who found that the properties of the mixture of precipitated zinc sulphide and barium sulphate were greatly changed by such treatment. After that date, lithopone (sometimes called Griffiths' White in the literature) assumed increasing importance as a pigment. One disadvantage, however, accompanies this important step,—the pigment is apt to develop a yellowish discoloration during calcination. If the yellowish tint is very slight, it can be corrected by "bluing",—the addition of ultramarine blue to the calcined pigment. The correction of the color may be explained as follows, from the standpoint of well known laws of physics:

Lithopone ordinarily reflects about 73% of the incident light. If yellowish in tint, it reflects more of the light corresponding to this wave length than of the other longer and shorter wave lengths (high yellowish tint may be due to a greater reflection of two different wave lengths which, combining, give the effect of yellow). In any case, the addition of ultramarine blue merely cuts down the reflection of the wave lengths which give the appearance of yellow, and consequently has the disadvantage of reducing the total brightness of the pigment (percentage of the incident light reflected).

In many cases, however, the yellowish tint developed in muffling is too pronounced to be corrected; hence, lithopones are often encountered on the market which are "off" in color on the yellow side.

The cause of the yellowish tint, usually developed during calcination, is oxidation of one of the components of the raw pigment, doubtless the zinc sulphide. This was demonstrated by the following simple experiment:

A batch of raw lithopone was prepared by the usual process familiar to those skilled in the art. Two samples were taken from the batch and calcined in two small iron crucibles, lined with asbestos paper to prevent contact of the pigment and metal. One crucible was left open; the other covered with a gas-tight lid furnished with a vent pipe, which was in turn provided with a water seal, to absolutely prevent ingress of air. Both crucibles were placed in an electrically-heated muffle previously preheated to 700° C., and allowed to remain one hour. The pigment was then quenched with a minimum exposure to air. The lithopone from the open crucible was found to be seriously discolored, and had an ivory tint when ground in oil. That calcined in the closed crucible, from which the air had been driven by the evolved steam during the period of calcination, was pure white.

The object of the invention, which is the subject of this application, is to make possible the exclusion of air and other oxidizing gas mixtures from the lithopone during calcination; I have accomplished this by an improvement in the muffle construction.

Some of the literature on lithopone refers to its calcination in "sealed retorts" or with "exclusion of air," although the reason for the precaution is not given. These terms have evidently been used in a comparative sense to denote that the operation is not at all one of roasting, and that the doors of the lithopone muffles are kept closed as much as possible. The practical development of lithopone muffles has been limited to fire clay retorts or tile-lined muffle furnaces. Into these the lithopone is shoveled with the doors open. Later, the doors are opened again for rabbling, and finally the lithopone is raked out for quenching. Aside from ingress of air at these times, the muffle walls themselves are not impermeable to gases. These can diffuse through the walls of the fire clay retort, and in muffles with fire brick or tile walls, it is impossible to avoid cracks, which allow leakage of gases. Hence the terms "sealed retorts" and "exclusion of air" used in the literature describing the used methods of lithopone calcination are necessarily to be interpreted as merely relative.

The ideal lithopone muffle should have a continuous wall, impermeable to gases. A metal wall fufills these conditions, as does also one of fused silica, porcelain or other non-porous materials.

From one aspect, my invention comprises calcining lithopone while preventing access of air to the lithopone at any time during the calcination; from another aspect, my invention comprises a new lithopone muffle or retort having a substantially continuous wall impermeable to gases and capable of withstanding the chemical and physical conditions to which it is subjected during calcination.

In constructing a muffle having the above-mentioned characteristics I have sought to develop iron as the material for the walls because of its availability and cheapness. It is to be understood, however, that any other material impermeable to gases and unacted on by the lithopone answers just as successfully.

The results of the numerous experiments which I have made have conduced to the conclusion that a pure white pigment is readily obtained with the usual time and temperature of calcination (familiar to those skilled in the art) when air is rigorously excluded by a continuous impermeable wall. It must be added, however, that if the calcination is carried out at too high a temperature, or for too long a time, yellowing will still occur in the absence of air. This is presumably due to interaction between the zinc sulphide and some other constituents present, possibly the barium sulphate, or steam generated from "combined water". On the other hand, the color is in all cases better than it would be if more or less air were allowed access to the pigment during calcination.

There is one serious disadvantage in the use of an iron retort, namely, discoloration of the lithopone calcined in contact with the metal. Where the pigment comes in contact with the iron, black patches of iron sulphide form on its surface. Hence it is desirable when iron retorts are employed to have them lined with some inert material. Non-metallic, impervious walls, such as fused silica or asbestos paper, do not have this advantage. Repeated use of an iron muffle considerably reduced the discoloration of the lithopone lying next to the wall. It is possible that, with continued use, an orginally unprotected iron might develop a coating of lithopone or iron sulphide, and no longer cause discoloration, but this procedure is obviously unsatisfactory. However, due to the practical advantages of a metal walled muffle, I have sought to overcome this difficulty, and have succeeded in the manner hereinafter described.

After experimenting with many metals and alloys, the material which I have found most suitable for the muffle wall is iron to which a thin skin of aluminum has been applied by the calorizing process. The surface of aluminum or an iron aluminum rich in this metal does not discolor the lithopone calcined in contact therewith.

The calorizing process, which is part of the prior art, comprises heating the metal to be treated, such as a length of cast steel pipe, in contact with a mixture of aluminum powder and aluminum oxide in an atmosphere of hydrogen. The heating occurs within a rotating furnace which may in turn be of larger diameter pipe. The object of the aluminum oxide is to prevent melting of the aluminum. After a rather long period of heating at about 900° C., it will be found that the aluminum has alloyed with the iron surface to form a protective coating or skin. The exterior is nearly pure aluminum, with this metal penetrating the iron to a certain depth in the form of an alloy progressively poorer in aluminum. Due to this alloying action, there is no danger of the protective coating peeling off, as there is no line of demarcation between the aluminum and iron.

In addition to calorized iron, I have found that enameled iron may be used, provided the enamel is of a high grade which does not soften at the calcining temperature (i. e. about 650° C.).

One form which my invention may assume is exemplified in the accompanying digrammatic drawing in which Fig. 1 is a view of a side elevation of the calcining retort, and Fig. 2 is a view of a cross section on the line 2—2 of Fig. 1.

The cylindrical retort 5 is composed of iron calorized on both its interior and exterior surfaces. Resistance wire 6 is wound around the retort 5 to form an electrical heating element, which in turn is covered by magnesia pipe-lagging 7 to prevent loss of heat. A calorized iron cover 8 welded to one end of the retort, this cover also being provided with magnesia lagging 9. The other end of the retort is normally closed by a calorized cover 10 held in place by iron yokes 11. The covers 8 and 10 are provided with centrally disposed openings in which hollow shafts 12 and 13, respectively, are firmly secured. A pyrometer in the form of a thermocouple 14 is inserted through shaft 12 so that it reaches to about the middle of the retort. A pipe 15 is connected at one end through a stuffing box 16 with the bore of the shaft 13, and at the other end with a water seal (not shown.)

The shafts 12 and 13 are mounted in bearings 17 and 18, respectively, carried by suitable supports 19 and 20. A sprocket wheel 21, keyed to the shaft 12, is rotated by gear wheel 22.

The ends of the resistance wire 6 are connected with copper rings 23 and 24 which maintain electrical contact with brush terminals 25 and 26.

A block 27 with a concave upper surface is disposed beneath the retort near the end thereof to which is fastened the removable cover 10, said block serving to support the retort when the cover 10 is removed.

A vessel 28, partly filled with water for quenching the calcined lithopone, is disposed under the end of the retort through which the lithopone is withdrawn.

My new process is carried out in the apparatus above described as follows: dried raw lithopone is introduced into the retort 5, and the cover 10 securely fastened so that the end of the retort is practically air-tight. An electric current is then caused to flow through the resistance wire, and the retort is slowly rotated. This rotation of the retort serves to stir or agitate the lithopone in such a way that all portions of the lithopone are subjected to a uniform heating, thereby preventing local overheating. The calcination is continued for about 30 minutes after the temperature in the retort, as shown by the pyrometer, has reached 600° C. The retort is then opened and the pigment raked out rapidly and quenched in the vessel 28 with as little exposure to air as possible.

Although my new apparatus has been described in great detail it will be understood that numerous changes may be made therein without departing from my invention. For instance, I may use coal or oil as the heating medium instead of electricity, and I may use a retort having an interior cross section other than circular. The vent pipe 15 may be provided with an automatic escape valve instead of terminating in a water seal, and the vent pipe may be connected with the retort at some point other than the cover.

I claim:—

1. The process of muffling lithopone which comprises calcining the lithopone in a closed retort whose interior walls are composed of calorized iron.

2. The process of muffling lithopone which comprises calcining the lithopone in a closed iron retort having an interior lining of aluminum, and preventing access of air to the lithopone at any time during the calcination.

In testimony whereof I affix my signature.

JAMES ELIOT BOOGE.

Certificate of Correction.

It is hereby certified that in Letters Patent No. 1,535,760, granted April 28, 1925, upon the application of James Eliot Booge, of Wilmington, Delaware, for an improvement in " Manufacture of Lithopones," errors appear in the printed specification requiring correction as follows: Page 2, line 65, for the word " advantage " read *disadvantage;* same page, line 124, before the word " welded " insert the word *is;* and that the said Letters Patent should be read with these corrections therein that the same may conform to the record of the case in the Patent Office.

Signed and sealed this 26th day of May, A. D. 1925.

[SEAL.]
KARL FENNING,
*Acting Commissioner of Patents.*